US008651069B2

(12) United States Patent
Borgia et al.

(10) Patent No.: US 8,651,069 B2
(45) Date of Patent: Feb. 18, 2014

(54) WAX TYPE THERMOSTAT FOR THE COOLING SYSTEM OF AN INTERNAL COMBUSTION ENGINE

(71) Applicant: GM Global Technology Operations LLC, Detroit, MI (US)

(72) Inventors: Luca Borgia, Forno Canavese (IT); Carmine Pezzella, Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/626,694

(22) Filed: Sep. 25, 2012

(65) Prior Publication Data
US 2013/0074789 A1    Mar. 28, 2013

(30) Foreign Application Priority Data
Sep. 28, 2011 (GB) .................................. 1116690.7

(51) Int. Cl.
*F01P 7/02* (2006.01)
(52) U.S. Cl.
USPC ....................................................... 123/41.04
(58) Field of Classification Search
USPC ................................................. 123/41, 41.04
See application file for complete search history.

(56) References Cited

U.S. PATENT DOCUMENTS

| 3,734,405 | A | * | 5/1973 | Wagner | 236/34.5 |
|---|---|---|---|---|---|
| 4,548,354 | A | * | 10/1985 | Wagner et al. | 236/34.5 |
| 4,560,104 | A | * | 12/1985 | Nagumo et al. | 236/34.5 |
| 4,883,225 | A | * | 11/1989 | Kitchens | 236/34.5 |
| 4,948,043 | A | * | 8/1990 | Kuze | 236/34.5 |
| 4,961,530 | A |  | 10/1990 | Wagner |  |
| 5,195,467 | A | * | 3/1993 | Kurz | 123/41.1 |
| 6,286,464 | B1 | * | 9/2001 | Abraham et al. | 122/14.31 |
| 6,742,716 | B1 | * | 6/2004 | Duprez et al. | 236/34.5 |
| 6,772,959 | B2 | * | 8/2004 | Cardinali Ieda | 236/34.5 |
| 2001/0019081 | A1 |  | 9/2001 | Mabboux |  |
| 2001/0035138 | A1 | * | 11/2001 | Fukamachi | 123/41.1 |
| 2003/0150923 | A1 | * | 8/2003 | Leu | 236/34.5 |
| 2010/0181516 | A1 | * | 7/2010 | Palanchon et al. | 251/324 |

FOREIGN PATENT DOCUMENTS

| EP | 0 189 565 A2 | 8/1986 |
|---|---|---|
| EP | 0 484 624 A1 | 5/1992 |

* cited by examiner

*Primary Examiner* — Lindsay Low
*Assistant Examiner* — Charles Brauch
(74) *Attorney, Agent, or Firm* — John A. Miller; Miller IP Group, PLC

(57) ABSTRACT

A wax-type thermostat for the cooling system of an internal combustion engine (ICE) provided with a radiator and a coolant loop circuit linking the radiator to the ICE, and a by-pass conduit. The thermostat comprises
  a thermostat body with one inlet from the radiator, one inlet from the ICE, and one outlet to the ICE.
The thermostat further comprises a closure element integral to a first piston that closes or opens a thermostat internal pathway running from the inlet from the radiator to the outlet to the ICE,
a main wax chamber thermally connected to the coolant within the thermostat body, and
a spring to return the closure element towards its closing position.
Also provided is a first means for moving the first piston when a volume variation in the wax occurs.

20 Claims, 4 Drawing Sheets

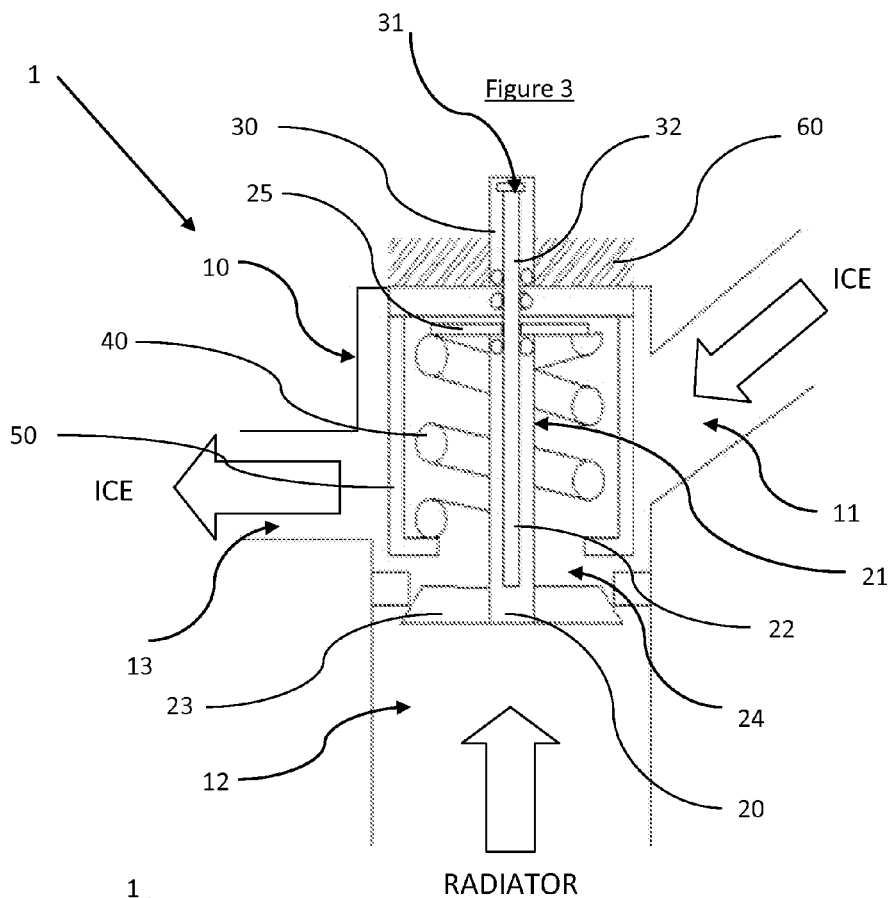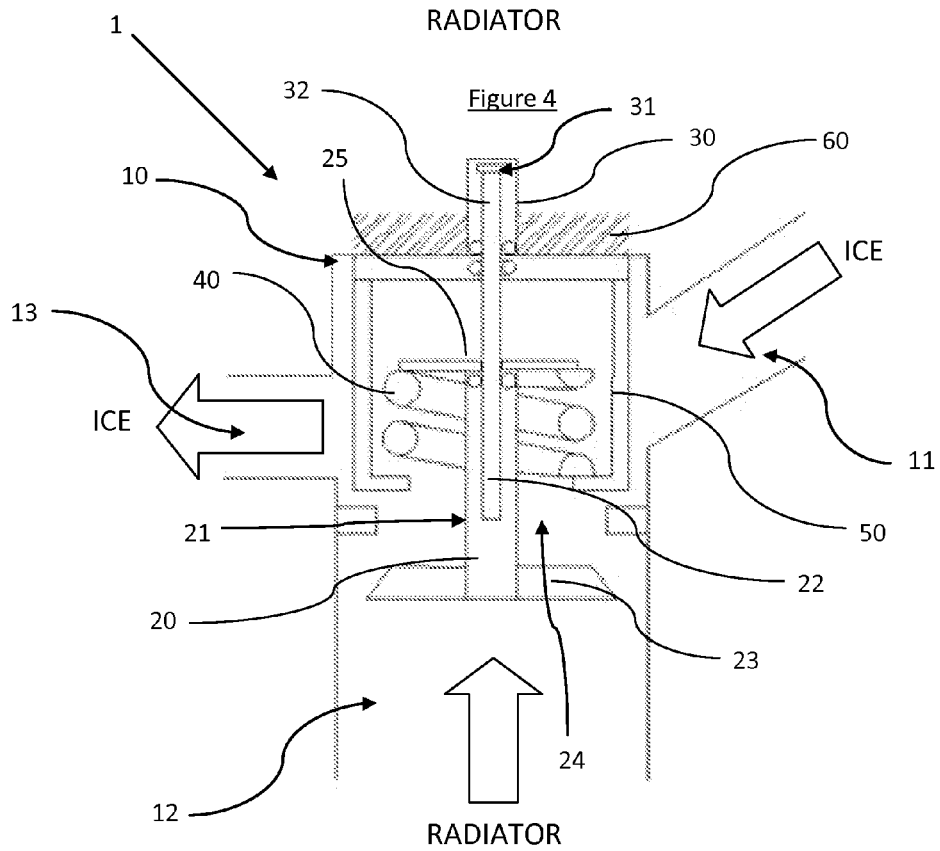

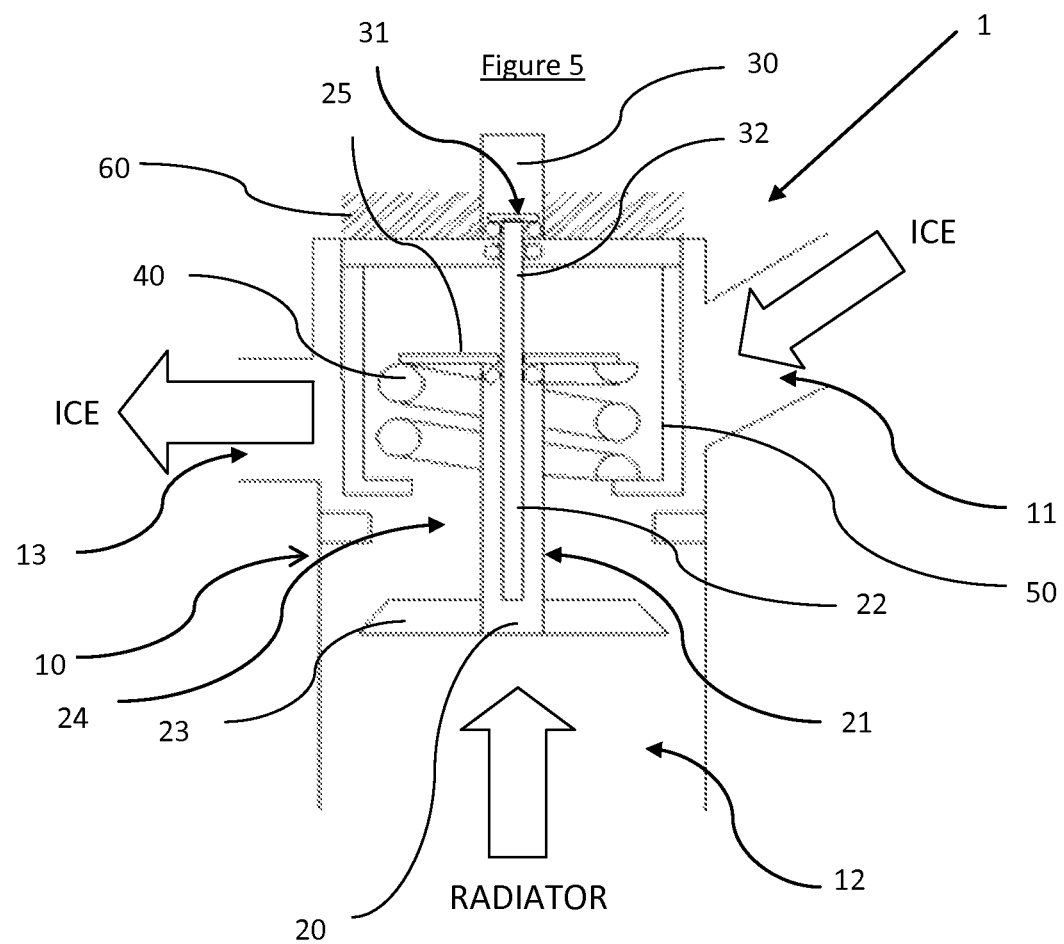

WAX TYPE THERMOSTAT FOR THE COOLING SYSTEM OF AN INTERNAL COMBUSTION ENGINE

FIELD OF THE INVENTION

The present invention concerns a wax-type thermostat for the cooling system of an internal combustion engine (ICE), e.g. an internal combustion engine for a diesel power-train system provided with a cooling loop circuit.

BACKGROUND ART

As well known, in an internal combustion engine, the combustion process and pollutant emissions are worst at start-up, when the internal combustion engine is still cold.

In order to reduce the warm-up time necessary to make the internal combustion engine fully effective, i.e. in order to speed up the warm-up of the internal combustion engine (ICE), is well known in the art to divert the coolant flowing in the cooling loop circuit back to the engine, without allowing the coolant to reach the relevant radiator, till the coolant temperature, and hence the engine, reaches a target temperature, that is around 90° C.

More in detail, a cooling circuit of an internal combustion engine usually comprises a circuit loop for the coolant (e.g. water), connecting the ICE to the radiator, and a coolant pump. The cooling circuit is usually provided with a by-pass conduit allowing to exclude the radiator, as well as with a thermostat that allows the coolant to divert back to internal combustion engine, and hence that prevents the coolant from flowing through the radiator, till the coolant temperature reaches said target temperature, that is generally about 90° C.

Such a thermostat, that is a three-way valve actuated by temperature, is usually a wax-type thermostat, in which a thermostat body comprises two inlets, coming from the engine via the by-pass conduit, and from the radiator respectively, and one outlet directed to the engine, as well as a closure element integral to a piston that is slidingly actuated by wax contained in a wax chamber, which in turn is thermally connected to the coolant flowing through the thermostat body, and in particular to the coolant coming from the aforesaid inlet from the engine.

In particular, the closure element of thermostats in a cooling system of an internal combustion engine opens or closes the pathway between the inlet from the radiator and the outlet to the engine, while the pathway between the inlet from engine and the outlet to engine remains usually open.

The thermostat includes a return spring biasing the closure element towards its closing position and, since the piston integral to the closure element of the thermostat is mechanically linked to the wax in the wax chamber, when the wax increases its volume (due to the raising of the coolant temperature through the thermostat body) the piston is pushed by the same wax, in contrast to the spring action, to move the closure element until it reaches its opening position.

Usually wax is chosen in such a way that when the target temperature of the coolant is almost reached, it changes its status from solid to liquid, expanding its volume as well, and thus pushing the piston in contrast to the spring and opening the pathway between the radiator inlet and the engine outlet of the thermostat.

To improve the behaviour of the thermostat, is well known to provide it with heating means, generally constituted by some electrical heater regulated by the ECU (Electronic Control Unit) of the power-train, heating the wax in said wax chamber.

The presence of an electrical heater for heating the wax even when the coolant has not yet reached the target temperature, thus opening the pathway between the radiator and the ICE when the ECU decides it is appropriate, allows a more stable behaviour of the thermostat as well as a quick cooling of the engine when the heat produced from this latter may cause overheating problems.

Such a thermostats for the cooling system of an internal combustion engine suffers from the problem that when the closure element opens for the first time the pathway from the radiator to the engine, the coolant coming from the radiator is colder (till $\Delta T° > 110°$ C.) than the coolant coming from engine and thus it may cause a quick falling of the wax temperature in the wax chamber, such a way the wax reduces its volume and the closure element quickly moves towards its fully close position, biased by said return spring.

At this point, the higher temperature of the coolant coming from the engine causes again a wax volume increase, such a way the thermostat closure element is pushed again towards its fully open position, allowing the low temperature coolant coming from radiator to reduce once more the wax temperature, etc.

Such an instable behaviour of the thermostat causes temperature fluctuations till a thermal steady state is reached.

It is therefore desirable to keep the closure element open during the starting transient when coolant with low temperature coming from the radiator starts to flow within the thermostat, in this way reducing the wax temperature in the wax chamber and thus inducing the closure element to close.

On the other hand, it should also be noticed that heating the wax with the aforesaid electrical heater within the wax chamber, as provided in a thermostat of the prior art, in order to keep open the thermostat, may lead, during the aforesaid starting transient, to the overheating of the wax in the chamber or to an insufficient opening of the thermostat closure element.

Thus, it is an aim of the present invention to provide a new wax-type thermostat for the cooling system of an internal combustion engine that does not show the problems described above, and hence that allows the closure element of the thermostat to be kept open during the cooling starting transient of the engine.

Another aim of this invention is to provide a new wax-type thermostat for the cooling system of an internal combustion engine that prevents thermal instability in the cooling system and that proves to be effective to quickly keep the coolant at a target steady temperature.

SUMMARY OF THE INVENTION

These and other aims are achieved by a wax-type thermostat for the cooling system of an internal combustion engine according to the features claimed in independent claim 1. Further peculiar features of the wax-type thermostat according to the invention are claimed in the dependent claims.

According to the invention, the wax-type thermostat for the cooling system of an internal combustion engine provided with a radiator and a coolant loop circuit linking the radiator to the internal combustion engine, as well as a by-pass conduit, comprises:

a thermostat body with one inlet from the radiator, one inlet from the internal combustion engine via said by-pass conduit, and one outlet to the internal combustion engine;

a closure element, integral to a first piston, that is movable from a closing position of an internal pathway running from the inlet from the radiator to the outlet to the internal combustion engine, to an opening position thereof, and vice-versa;

a main wax chamber in thermal connection to the coolant within the thermostat body;

a spring to return the closure element towards its closing position;

first means for moving the first piston when a volume variation in the wax contained into the main wax chamber occurs.

The thermostat also comprises an auxiliary wax chamber with second means for moving the first piston when a volume variation in wax contained in said auxiliary wax chamber occurs, as well as heating means in thermal connection to the auxiliary wax chamber.

The provision of an auxiliary wax chamber, that can be substantially thermally insulated by the coolant within the thermostat (e.g. it may placed at least partly outside the thermostat body), and that is separated from the main wax chamber, allows to keep the thermostat closure element open during the cooling starting transient, independently from the status of the main wax chamber, thus improving the thermostat behaviour.

Moreover, the use of an auxiliary wax chamber separated from the main wax chamber may prevent wax overheating problems in the main wax chamber.

According to a preferred embodiment of the invention, said main wax chamber is placed within said first piston and contains at least one pin. The first piston axially slides having regard to said pin, when the wax volume within the main wax chamber increases. The aforesaid second means for moving the first piston comprises a second piston axially sliding within the auxiliary wax chamber when the wax contained therein undergoes a volume variation. Advantageously, the stem of said second piston coincides to the said pin contained in the main wax chamber.

This means that when said heating means are operated, the second piston axially slides within the auxiliary wax chamber and, hence, the pin within the main wax chamber axially slides, thus reducing the internal volume of the main wax chamber, when the wax therein is liquid, and/or directly pushing the chamber, and thus the first piston, when the wax in the main wax chamber is solid.

BRIEF DESCRIPTION OF THE DRAWINGS

A preferred embodiment of the present invention will be now described, as a non-limiting example, with reference to the enclosed figures, wherein:

FIG. 3 is a schematic frontal cross-section view of a wax-type thermostat, according to one embodiment of the present invention, with the closure element in its close position;

FIG. 4 is a schematic frontal cross-section view of the wax-type thermostat of FIG. 3, with the closure element held in its open position thanks to the wax volume change in the thermostat main wax chamber; and FIG. 5 is a schematic frontal cross-section view of the wax-type thermostat of FIG. 3, with the closure element held in its open position thanks to the wax volume change in the thermostat auxiliary wax chamber.

DETAILED DESCRIPTION OF A PREFERRED EMBODIMENT OF THE PRESENT INVENTION

Figure 1:
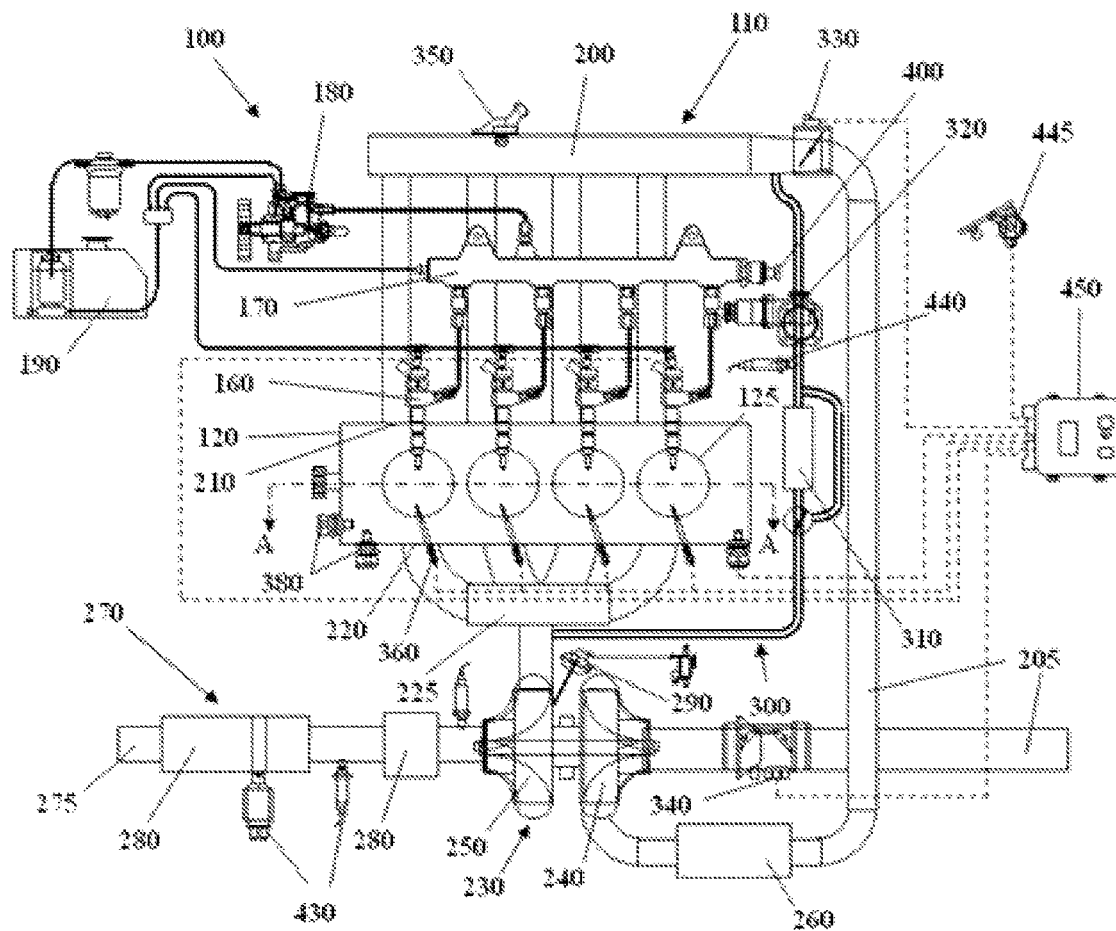
FIG. 1 is a schematic layout of a diesel power-train system to which embodiments of the present invention may apply.

With reference to FIG. 1, it should be pointed out that embodiments of the wax-type thermostat herein described, according to some embodiments of the present invention, may be applied in an automotive system 100 that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received a fuel source 190. Each of the cylinders 125 has at least two valves 215, actuated by a camshaft 135 rotating in time with the crankshaft 145.

The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

The automotive system 100 may also comprise an exhaust gas temperature sensor placed at the aftertreatment device 280 or, in any case, downstream to the ICE 110, e.g. at exhaust manifold 225 or at the exhaust ports 220.

Figure 2:
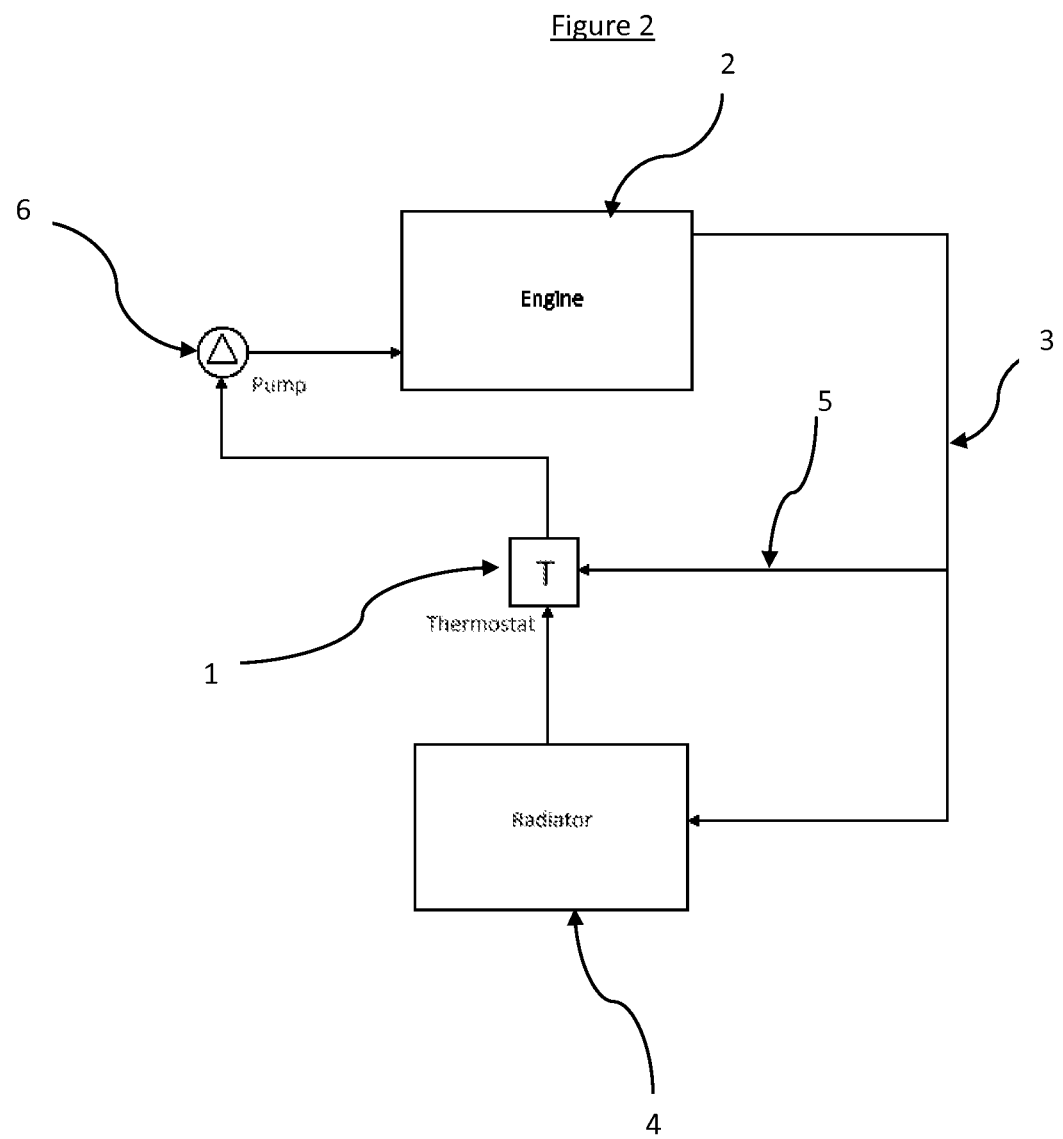
FIG. 2 is a schematic layout of a cooling system for an internal combustion engine to which an embodiment of the present invention may apply.

More in detail, with reference now to FIG. 2, the wax-type thermostat 1, according to an embodiment of the present invention, applies to a cooling system for a generic internal combustion engine (ICE) 2 comprising a loop circuit 3, fluidically connecting the ICE 2 to a radiator 4, a coolant (water) pump 6, a by-pass conduit 5, and said thermostat 1.

As shown in FIG. 2, the by-pass conduit 5 links the ICE 2 to the thermostat 1, such a way the coolant can directly reach the thermostat 1 without flowing through the radiator 4, in case the thermostat 1 prevent the coolant from flowing from the radiator 4 to the ICE 2.

The thermostat 1, therefore, comprises one inlet 11 (see also FIG. 3-5) for the coolant coming from the ICE 2, via the by-pass conduit 5, one inlet 12 for the coolant coming from the radiator 4 and one outlet 13 for directing the coolant towards the pump 6 and the ICE 2.

With reference now to FIGS. 3 to 5, the wax-type thermostat 1, according to one embodiment of the present invention, comprises a thermostat body 10 wherein—as already mentioned—its inner space opens in one inlet 11 connecting the thermostat 1 to said by-pass conduit 5, and hence to the ICE 2, one inlet 12 connecting the thermostat 1 to the radiator 4, and one outlet 13 connecting the thermostat 1 to the pump 6, and hence again to the ICE 2.

The inner space within the thermostat body 10 also houses a closure element 23, or plate, that is integral to a sliding first piston 21, and that engages an inner aperture 24, closing or opening this latter as a function of its position.

Said inner opening 24 is placed along a thermostat inner pathway that connects the inlet 12 from radiator 4 to the outlet 13 to the ICE 2, such a way the closure element 23, during its movement, may open or close such a pathway, by engaging or disengaging the aforesaid inner aperture 24.

In other words, thanks to first piston 21, the closure element 23 is movable from a closing position in which it closes the pathway from the radiator inlet 12 to the ICE outlet 13 and an opening position, in which it opens said pathway, and viceversa.

First piston 21, integral to the closure element 23, is shaped as a tubular element comprising an inner main wax chamber 20 and a piston head 25. First piston 21 is assembled within the thermostat 1 such a way it can axially slide from top to bottom in the drawings, and viceversa, within the thermostat inner space.

Main wax chamber 20 is placed within the thermostat 1 in thermal communication with coolant flowing within the inner space of the same thermostat 1, and it is filled with a wax that is chosen such a way it changes its state from solid to liquid, or in any case it changes its volume, at a predefined target temperature (usually about 90° C.).

Main wax chamber 20 also comprises an inner pin 22, protruding within the same main chamber 20, that allows first piston 21 to slide having regard to the same pin 22.

More in detail, as shown in the figures, first piston 21 is mounted on the inner pin 22, thanks to an annular seal, such a way it can axially slide in both directions with respect to said pin 22.

Therefore, pin 22, that is generally steady having regard to the main chamber 20 when the wax volume in the same main wax chamber 20 undergoes a variation, constitutes at least part of first means for moving the first piston 21 when a volume variation in the wax contained in the main wax chamber 20 occurs.

In fact, when an increase in the wax volume occurs, e.g. because the wax changes its state from solid to liquid, the corresponding wax pressure in the main wax chamber 20, acting on the steady pin 22 and on the inner walls of the same main chamber 20, causes the first piston 21 to slide having regard to pin 22, such a way this latter retract from main wax chamber 20 and the higher volume of liquid wax is well accommodated in the same main chamber 20, with the pin 22 retracted.

Thermostat 1 also comprises a spring 40, or other equivalent elastic means, that is placed between a stirrup 50, provided within the thermostat body 10, and the first piston head 25, such a way it biases the piston head 25 towards a position that corresponds to the aforesaid closing position of the closure element 23.

Spring 40, therefore, when its action is not counteracted by the wax volume increase in the main wax chamber 20, returns the closure element 23 towards its closing position, where the pathway between the radiator inlet 12 and the ICE outlet 13 is closed, moving the piston head 25 towards the top portion of the thermostat body 10 in the figures.

As the skilled person may appreciate, spring 40 and pin 22 cooperate to move the first piston 21 when a wax volume change (increase or decrease) occurs.

In fact, as already mentioned, when the wax volume in the main wax chamber 20 increases (preferably when the wax becomes liquid for the heat), the pin 22 retracts from the main wax chamber 20, thus inducing the first piston 21 to axially slide in contrast to the spring 40, while when the wax volume in the main wax chamber 20 decrease (when the wax becomes solid) the spring 40 returns back the first piston 21, acting on its head 25, such a way the pin 22 still fully protrudes within the same main wax chamber 20.

It should be noticed that even if a main wax chamber 20 made within the first piston 25 for the closure element 23 has been described above, any other configuration and displacement of the main wax chamber 20 within the thermostat body 10 may be alternatively chosen, provided that such a main wax chamber is in thermal connection to the coolant flowing within the thermostat 1 and that it comprises first means for moving the first piston 25, and hence the closure element 23, when a volume variation in the wax contained in said main wax chamber occurs.

According to one embodiment of the present invention, the wax-type thermostat 1 also comprises an auxiliary wax chamber 30 that is substantially insulated from the coolant flowing within the thermostat body 10 and that is associated to heating means, preferably controlled by the ECU (Electronic Control Unit), as well as to second means for moving the first piston 21 when a volume variation in the wax contained in the auxiliary chamber 30 occurs.

In the embodiment of the present invention shown in the figures, the auxiliary wax chamber 30 is integrally mounted at the outer top wall of the thermostat body 10, surrounded by some thermally insulating means 60, and comprises a second piston 31 that is slidingly mounted within the same auxiliary wax chamber 30.

The auxiliary wax chamber 30 may alternatively be only partly disposed outside the thermostat body 10, provided that any thermal connection of auxiliary chamber 30 with the coolant flowing within the thermostat 1 is substantially avoided.

Wax contained in the auxiliary wax chamber 30 is chosen to change volume, preferably by changing state from solid to liquid, at a second target temperature that can be not coincident to the target temperature to which the wax in the main wax chamber 20 undergoes a volume change.

Moreover, heating means for the auxiliary wax chamber 30, which may be preferably constituted by an electric heater controlled by the ECU, are preferably placed within the second piston 31, and in particular within its stem 32.

The stem 32 of the second piston 31 extends both in the auxiliary chamber 30 and, thanks to a proper hole surrounded by annular seals, through the wall of the thermostat body 10, within the inner space of the thermostat 1.

When the wax within the auxiliary chamber 30 is heated by said heating means and undergoes a volume change, the second piston 31 axially slides such a way its stem 32 moves into the thermostat body 10.

In fact, when the wax volume increases—due to heat produced by the heating means—in the auxiliary wax chamber 30, the corresponding wax pressure pushes the second piston 31 to axially slides such a way its stem 32 retracts from the same auxiliary chamber 30 to free a region in the auxiliary chamber 30 in order to accommodate the same wax.

On the other hand, when the wax volume in the auxiliary chamber 30 decreases, due to the switching off of the heating means, the spring 40, as will be apparent in what follows, usually pushes the second piston 31 to axially slide within the auxiliary wax chamber 30 till it fully protrudes within the same auxiliary wax chamber 30.

According to the embodiment of the present invention that is depicted in the enclosed figures, stem 32 is made in one piece with pin 22, such a way any movement of stem 32 corresponds to an identical movement of the same pin 22.

Movement of pin 22, in turn, results in a corresponding movement of the first piston 21. In fact, assuming that the wax contained in the main wax chamber 20 is solid, movement of the pin 22, due to the movement of second piston 31, transmits to the first piston 21 via the solid wax in the chamber 20.

On the contrary, in the case in which the wax in the main wax chamber 20 is liquid, movement of the pin 22, due to the second piston 31, results in a translation of pin 22 within the main wax chamber 20 that reduces the volume available for the wax and that causes a further movement of the first piston 21 having regard to the same pin 22.

As can be noticed, when the wax volume in the auxiliary wax chamber 30 decreases, e.g. the wax solidifies, pin 22, and thus stem 32, retract towards their starting position, i.e. with the second piston 31 fully housed in the auxiliary wax chamber, thanks to the action of the spring 40 on the first piston head 25.

Such a retraction movement of the second piston 31 is quick when the wax in the main wax chamber 20 is solidified, such a way the movement of the first piston head 25 transmits, via the solid wax, to pin 22 and hence to the stem 32 of the second piston 31, while when the wax in the main chamber 20 is still liquid, the retraction movement of the second piston 31 caused by the spring 40 is slower.

It should be considered that, as the skilled person may easily understand, any other mechanical means for transmitting the movement of the second piston 31, due to the volume change in the wax contained in the auxiliary wax chamber 30, to the first piston 21 within the main wax chamber 20 may alternatively be used.

The operation of the thermostat 1, described above, is the following.

At the engine 2 start-up, in case the temperature of the coolant in the radiator 3 is not too low having regard to the predefined target temperature for the coolant, the thermostat 1 operates as any conventional thermostat of a cooling system for an ICE 2.

That is, initially (FIG. 3) the closure element 23 of the thermostat 1 is biased by spring 40 towards its closing position, in which it closes the inner aperture 24 of the thermostat body 10, thus closing the pathway from the radiator inlet 12 to the ICE outlet 13.

Wax in the main wax chamber 20 is solid, and thus the first piston 21 does not slide having regard to the pin 22. Auxiliary wax chamber 30, second piston 31 and its relevant stem 22 are inactive.

In this situation, the thermostat 1 allows the coolant, impelled by the pump 6, to flow from the by-pass conduit 5, coming from the ICE 2, to the same ICE 2, thus excluding the radiator 4 from the cooling loop circuit 3. This allows the coolant to quickly increase its temperature.

When the temperature of the coolant reaches the target temperature to which the wax within the main wax chamber 20 undergoes a volume change (i.e. in this case it changes from solid to liquid), passage of the coolant from the ICE inlet 11 within the thermostat body 10, in thermal connection to the main wax chamber 20, causes such a volume variation in the wax contained therein and thus also causes the first piston 21 to axially slide having regard to the (now) steady pin 22 (see FIG. 4).

In particular, wax increases its volume and thus induces the first piston 21 to move, in contrast to the action of the spring 40, and hence retracting the pin 22 from the main wax chamber 20, such a way the closure element 23 moves towards its opening position, in which the inner aperture 24 is no more closed by the same closure element 23, and thus coolant from the radiator 4 may flow through the pathway in the thermostat 1 connecting the radiator inlet 12 to the ICE outlet 13.

As already mentioned, in case the temperature of the coolant coming from the radiator 4 is not too much colder than the temperature of the coolant coming from ICE 2 via the by-pass conduit 5, the first piston 21 maintains open the closure element 23 as required.

On the contrary, in case the temperature of the coolant coming from the radiator 4 is quite lower than the temperature of the coolant coming from the by-pass conduit 5, the entry of the low temperature coolant coming from the radiator inlet 12 within the thermostat body 10, mixing to the high temperature coolant coming from the ICE inlet 11, causes the falling of the overall temperature of the coolant flowing into the thermostat 1 and hence the solidification of the wax in the main wax chamber 20. Such a solidification of the wax, corresponding to a reduction of the volume taken by the same wax within the main chamber 20, would in turn cause the first piston 21, biased by spring 40, and the closure element 23 to return to the closing position of the aperture 24, thus preventing the coolant from flowing through the pathway between the radiator inlet 12 and ICE outlet 13.

In order to avoid such a behaviour, the thermostat 1, according to a particular embodiment of the present invention, provides that when a particularly high difference in the temperatures of the coolant coming from the ICE 2 and of the coolant coming from the radiator 4 is sensed by the ECU of the power-train system, generally in an indirect way, the same ECU activates, i.e. energizes, the electrical heater within the stem 32 of the second piston 30, such a way the wax in the auxiliary wax chamber 30 changes its volume, increasing this latter by changing from solid to liquid.

Such an increase in the wax volume within the auxiliary wax chamber 30 pushes the second piston 31, and its relevant stem 32, outside the auxiliary chamber 30 towards the inner space in the thermostat body 10 and thus, thanks to the fact that stem 32 of the second piston 31 and pin 22 are one and the same body, it pushes the pin 22 along an axial direction within the main chamber 20 directed towards the closure element 23.

In case the wax contained in the main wax chamber 20 is already solidified, sliding of the pin 22 (see FIG. 5) causes an identical sliding of the first piston 21, in contrast to the action of the spring 40, towards the opening position of the closure element 23, due to the fact that movement of pin 22 transmits unchanged, via the solid wax, to the first piston 21.

The same happens if the wax in the main wax chamber 20 is still liquid, as already discussed. As the skilled person may easily understand, such a solution allows to keep open the aperture 24, and thus it allows the coolant to flow from the radiator 4 within the thermostat 1 and towards the ICE 2, even if the temperature, at start-up, of the coolant from the radiator 4 is very low having regard to the temperature of coolant directly coming from the ICE 2 via the by-pass conduit 5.

When the ECU, on the basis of predefined external parameters, deactivates the electrical heater within the stem 32, wax in the auxiliary wax chamber 30 decreases its volume, by changing from liquid to solid, and thus spring 40 is free to act indirectly on the pin 22 and stem 32, such a way the second piston 31 returns back in its starting position fully housed within the same auxiliary wax chamber 30.

The invention claimed is:

1. A wax-type thermostat, the thermostat comprising:
    a thermostat body having an inlet, and an outlet;
    a closure element, integral to a first piston, that is movable from a closing position of a thermostat internal pathway running from said inlet to said outlet, and to an opening position thereof, and vice-versa;
    a main wax chamber containing wax therein and being in thermal connection to coolant within the thermostat body, wherein the first piston moves when a volume variation in the wax contained in the main wax chamber occurs;
    a spring to return the closure element towards its closing position; and
    an auxiliary wax chamber containing wax therein, wherein said first piston moves when a volume variation in the wax contained in the auxiliary wax chamber occurs, and a heating element that is in thermal connection to said auxiliary wax chamber.

2. The wax-type thermostat according to claim 1, wherein a second piston moves within the auxiliary wax chamber when the wax contained therein undergoes a volume variation, said second piston acting on said first piston.

3. The wax-type thermostat according to claim 1, wherein said main wax chamber is placed within said first piston and wherein moving the first piston comprises at least one pin protruding within said main wax chamber, said first piston being slidable relative to said at least one pin.

4. The wax-type thermostat according to claim 3, wherein said at least one pin is a stem of said second piston.

5. The wax-type thermostat according to claim 1, wherein said auxiliary wax chamber is at least partly placed outside of said thermostat body.

6. The wax-type thermostat according to claim 1, wherein said heating element comprises an electrically actuated heater.

7. The wax-type thermostat according to claim 2, wherein said heating element is placed within said second piston.

8. A cooling system for an internal combustion engine provided with a radiator, a coolant loop circuit linking the radiator to the internal combustion engine, a by-pass conduit, and a wax-type thermostat, said thermostat comprising:
    a thermostat body with one inlet from the radiator, one inlet from the internal combustion engine via said by-pass conduit, and one outlet to the internal combustion engine;
    a closure element, integral to a first piston, that is movable from a closing position of a thermostat internal pathway running from said inlet from the radiator to said outlet to the internal combustion engine, to an opening position thereof, and vice-versa;
    a main wax chamber containing wax therein and being in thermal connection to the coolant within the thermostat body, wherein the first piston moves when a volume variation in the wax contained in the main wax chamber occurs;
    a spring to return the closure element towards its closing position;
    an auxiliary wax chamber containing wax therein and that moves said first piston when a volume variation in the wax contained in the auxiliary wax chamber occurs; and
    a heating element in thermal connection to said auxiliary wax chamber.

9. A power-train system including an internal combustion engine and a cooling system for the internal combustion engine, wherein the cooling system comprises a radiator, a coolant loop circuit linking the radiator to the internal combustion engine, a by-pass conduit, and a wax-type thermostat, said thermostat comprising:
    a thermostat body with one inlet from the radiator, one inlet from the internal combustion engine via said by-pass conduit, and one outlet to the internal combustion engine;
    a closure element, integral to a first piston, that is movable from a closing position of a thermostat internal pathway running from said inlet from the radiator to said outlet to the internal combustion engine, to an opening position thereof, and vice-versa;
    a main wax chamber containing wax therein and being in thermal connection to the coolant within the thermostat body, wherein the first piston moves when a volume variation in the wax contained in the main wax chamber occurs;
    a spring to return the closure element towards its closing position;
    first means for moving the first piston when a volume variation in the wax contained into the main wax chamber occurs;
    an auxiliary wax chamber containing wax therein and that moves said first piston when a volume variation in the wax contained in the auxiliary wax chamber occurs; and
    a heating element in thermal connection to said auxiliary wax chamber.

10. The system according to claim 8, wherein the auxiliary wax chamber that moves the first piston comprises a second piston moving within the auxiliary wax chamber when the wax contained therein undergoes a volume variation, said second piston acting on said first piston.

11. The system according to claim 8, wherein said main wax chamber is placed within said first piston and wherein moving the first piston when a volume variation in the wax contained in the main wax chamber occurs comprises at least one pin protruding within said main wax chamber, said first piston being slidable relative to said at least one pin.

12. The system according to claim 11, wherein said at least one pin is a stem of said second piston.

13. The system according to claim 8, wherein said auxiliary wax chamber is at least partly placed outside of said thermostat body.

14. The system according to claim 8, wherein said heating element comprises an electrically actuated heater.

15. The system according to claim 10, wherein said heating element is placed within said second piston.

16. The system according to claim 9, wherein moving the first piston comprises a second piston moving within the auxiliary wax chamber when the wax contained therein undergoes a volume variation, said second piston acting on said first piston.

17. The system according to claim 9, wherein said main wax chamber is placed within said first piston and wherein moving the first piston comprises at least one pin protruding within said main wax chamber, said first piston being slidable relative to said at least one pin.

18. The system according to claim 17, wherein said at least one pin is a stem of said second piston.

19. The system according to claim 9, wherein said auxiliary wax chamber is at least partly placed outside of said thermostat body.

20. The system according to claim 9, wherein said heating element comprises an electrically actuated heater.

* * * * *